(No Model.)
G. HOLGATE.
CURING AND PRESERVING MEATS.
No. 356,766. Patented Feb. 1, 1887.
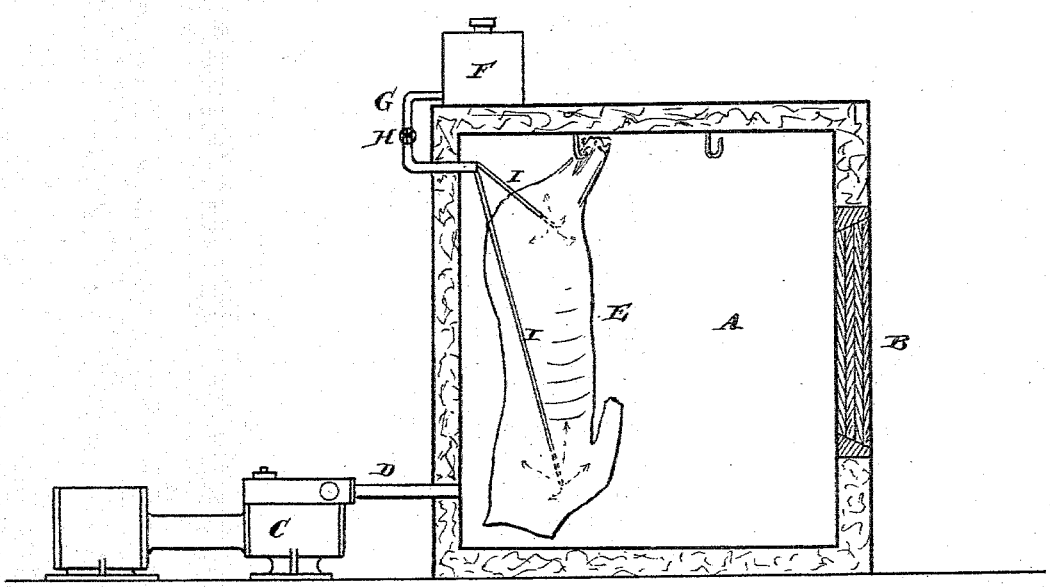
Attest  
[signatures]
Inventor  
George Holgate  
[signatures]

UNITED STATES PATENT OFFICE.

GEORGE HOLGATE, OF PHILADELPHIA, PENNSYLVANIA.

CURING AND PRESERVING MEATS.

SPECIFICATION forming part of Letters Patent No. 356,766, dated February 1, 1887.

Application filed March 9, 1886. Serial No. 194,521. (No specimens.)

*To all whom it may concern:*

Be it known that I, GEORGE HOLGATE, of the city and county of Philadelphia, and State of Pennsylvania, have invented an Improvement in Processes for the Preservation of Animal Matters, of which the following is a specification.

My invention has reference to processes for the preservation of animal substances; and it consists in certain improvements, all of which are fully set forth in the following specification, and shown in the accompanying drawing, which forms part thereof.

In Letters Patent No. 313,736, and dated March 10, 1885, granted to me, is described a process for the preservation of animal substances by first exhausting the air from the matter to be preserved and then treating it to an atmosphere of sulphurous and carbonic-acid gases. This application is for an improvement in the process therein set out.

In carrying out my invention I inclose the substances to be preserved in an air-tight chamber and then exhaust the air therefrom. I next admit directly into the said substance in its deaerated condition liquid anhydrous sulphurous and carbonic acids, which may be contained in the same carboy or vessel as a binary liquid and fed to the animal matter by pipes. This process is particularly applicable to sides of beef, or flesh in large pieces, but is also suitable for pork, game, fish, poultry, eggs, &c.

In preserving beef it is advisable to admit the liquid anhydrous sulphurous and carbonic acids directly into the joints, which parts are usually the most heated, and the vacuum insures the liquid acids being instantly vaporized and permeating every portion of the substance to be preserved, and the sudden expansion, due to the conversion of the liquid acids into gases, creates intense cold, eliminating the last objectionable caloric contained in the animal matter and inducing the requisite condition for preservation.

In the drawing is shown a sectional elevation of apparatus for carrying on my improved process.

A is the air-tight compartment, and may be made in any manner desired and be provided with the door B for entrance.

E represents the meat or substance to be preserved, which is hung up or placed within said chamber. When the chamber A is sealed, the air is drawn off by pipe D and vacuum-pump C and a vacuum created in the chamber.

F is the carboy containing the binary liquid of anhydrous sulphurous and carbonic acid, and is conveyed by a pipe, G, having a valve, H, to within the chamber A, from which the preserving-fluid is conducted by pipes I to one or more places in or on the substance to be preserved.

The apparatus may be modified in various ways, the particular construction being immaterial.

In practice it is difficult to obtain a strictly anhydrous mixture of sulphurous and carbonic acids; hence, while I use the word "anhydrous," it is to be understood that substantially anhydrous sulphurous and carbonic acids are included.

One of the great advantages of my improved process consists in the fact that when the liquid anhydrous sulphurous and carbonic-acid gases are fed to the interior of the meat or substance to be preserved the chilling effect is from the interior outward, or toward the surface, expelling all deleterious influences to putrefaction or a diseased state in the meat. In the old method of chilling from the outside to the center there was a tendency to lock up or drive inward the heat and deleterious influences, inducing oxidation, and consequent injury to the meat; hence this feature of chilling from the interior outward is one of the utmost importance.

Any suitable form of apparatus may be used, as all that is required is an air-tight chamber, in which the substance to be preserved is placed, a vacuum-pump to exhaust the air therefrom, and pipes to convey the liquid acids into the substances to be preserved.

In practice the pipes conveying the acids may be simply placed in contact with the animal matter, or may be inserted into the interior of same, and owing to the partial vacuum the liquid is instantly changed to gases and permeates every particle of the animal substance. The substance is treated for from one-half to several hours, according to the requirements in different cases and the climate in which it is to be used. I therefore do not limit myself to any specific length of time for the treatment.

Having now described my invention, what I claim as new, and desire to secure by Letters Patent, is—

1. The method of curing and preserving meats by injecting into the substance of the same liquefied gases.

2. The method of cooling and curing meats by injecting into the substance of the same, while in a partial vacuum, liquefied gases, as set forth.

3. The method of cooling and preserving or curing, which consists in subjecting the animal substance to a partial vacuum, and then injecting below the surface a binary liquid composed of anhydrous sulphurous acid and carbonic-acid gases under pressure.

4. The herein-described process for the preservation of animal substances—such as beef, game, fish, poultry, &c.—which consists in exhausting the air from around them and admitting liquid anhydrous or substantially anhydrous sulphurous and carbonic acids into the interior, whereby the gases therefrom shall pass in all directions to the surface, permeating every portion of the substance and simultaneously reducing its temperature.

5. The process of simultaneously cooling and curing meats by injecting liquefied gases directly into and below the surface of the meats while the air is exhausted from the chamber in which the meats are treated, thus curing and expelling animal heat at one operation.

In testimony of which invention I hereunto set my hand.

GEORGE HOLGATE.

Witnesses:
R. M. HUNTER,
E. M. BRECKINREED.